United States Patent
Bhagwan

(10) Patent No.: US 11,922,937 B2
(45) Date of Patent: *Mar. 5, 2024

(54) ELECTRONIC MESSAGE TRANSMISSION

(71) Applicant: Verizon Media Inc., New York, NY (US)

(72) Inventor: Varun Bhagwan, Los Gatos, CA (US)

(73) Assignee: Yahoo Assets LLC, New York, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/503,810

(22) Filed: Oct. 18, 2021

(65) Prior Publication Data

US 2022/0036901 A1   Feb. 3, 2022

Related U.S. Application Data

(63) Continuation of application No. 15/941,395, filed on Mar. 30, 2018, now Pat. No. 11,151,991.

(51) Int. Cl.
*G10L 15/22*  (2006.01)
*G10L 15/26*  (2006.01)
*H04W 52/02*  (2009.01)
*H04W 84/12*  (2009.01)

(52) U.S. Cl.
CPC .............. *G10L 15/22* (2013.01); *G10L 15/26* (2013.01); *G10L 2015/223* (2013.01); *H04W 52/0229* (2013.01); *H04W 84/12* (2013.01)

(58) Field of Classification Search
CPC ... G10L 15/22; G10L 15/26; G10L 2015/223; H04W 52/0229; H04W 84/12; Y02D 30/70; G06F 3/167; H04L 12/12
See application file for complete search history.

(56) References Cited

U.S. PATENT DOCUMENTS

| | | | |
|---|---|---|---|
| 8,340,975 B1* | 12/2012 | Rosenberger | G10L 15/22 704/274 |
| 9,691,378 B1* | 6/2017 | Meyers | G10L 21/028 |
| 9,697,378 B2 | 6/2017 | Meyers et al. | |
| 2003/0210770 A1* | 11/2003 | Krejcarek | H04M 1/715 379/88.01 |
| 2011/0054900 A1* | 3/2011 | Phillips | G10L 15/30 704/235 |
| 2014/0007117 A1* | 1/2014 | Sima | G06F 21/54 718/102 |

(Continued)

*Primary Examiner* — Michael Colucci
(74) *Attorney, Agent, or Firm* — Cooper Legal Group LLC

(57) ABSTRACT

One or more computing devices, systems, and/or methods for detecting trigger phrases and transmitting electronic messages to devices are provided. For example, audio received via a microphone of a first device may be monitored. Responsive to detecting a first trigger phrase in a first audio segment identified during the monitoring, a first electronic message comprising instructions to activate a microphone function of a second device may be generated and the first electronic message may be transmitted to the second device. Responsive to detecting a second trigger phrase in a second audio segment identified during the monitoring, a second electronic message comprising instructions to activate a microphone function of a third device may be generated and the second electronic message may be transmitted to the third device.

20 Claims, 11 Drawing Sheets

(56) References Cited

U.S. PATENT DOCUMENTS

| | | | |
|---|---|---|---|
| 2014/0229184 A1* | 8/2014 | Shires | H04L 12/282 |
| | | | 704/275 |
| 2014/0278435 A1* | 9/2014 | Ganong, III | G10L 15/22 |
| | | | 704/275 |
| 2016/0134966 A1* | 5/2016 | Fitzgerald | H04R 3/005 |
| | | | 381/123 |
| 2016/0217790 A1* | 7/2016 | Sharifi | G10L 15/22 |
| 2017/0206896 A1* | 7/2017 | Ko | G06F 3/16 |
| 2017/0245076 A1* | 8/2017 | Kusano | H04L 65/1059 |
| 2017/0263247 A1* | 9/2017 | Kang | G10L 15/22 |
| 2018/0158460 A1* | 6/2018 | Lee | G10L 15/22 |
| 2018/0182389 A1* | 6/2018 | Devaraj | H04L 51/224 |
| 2018/0247645 A1* | 8/2018 | Li | G06F 3/167 |
| 2018/0322870 A1* | 11/2018 | Lee | H04N 21/4394 |
| 2019/0043481 A1* | 2/2019 | Georges | G10L 15/02 |
| 2019/0174226 A1* | 6/2019 | Yang | G10L 15/22 |
| 2019/0253849 A1* | 8/2019 | Ryder | H04L 51/06 |
| 2019/0325869 A1* | 10/2019 | Mitic | G10L 15/08 |

* cited by examiner

ELECTRONIC MESSAGE TRANSMISSION

RELATED APPLICATION

This application claims priority to and is a continuation of U.S. application Ser. No. 15/941,395, filed on Mar. 30, 2018, entitled "ELECTRONIC MESSAGE TRANSMISSION", which is incorporated by reference herein in its entirety.

BACKGROUND

Many devices, such as smartphones, tablets, voice command devices and/or (e.g., other types of) virtual assistant devices may allow a user to provide a command (e.g., using a conversational interface) and/or perform an action based upon the command. Such a device may rely on the user to say a trigger phrase in order to receive the command. Accordingly, the device may continuously (e.g., constantly) monitor audio (e.g., of an area around the device) using one or more microphones. However, the (e.g., continuous) monitoring may deplete a power source (e.g., a battery) of the device and/or the (e.g., continuous) monitoring of the device (e.g., which may be connected to the internet) may compromise privacy of the user.

SUMMARY

In accordance with the present disclosure, one or more computing devices and/or methods are provided. In an example, audio received via a microphone of a first device may be monitored. Responsive to detecting a first trigger phrase in a first audio segment identified during the monitoring, a first electronic message comprising instructions to activate a microphone function of a second device may be generated and the first electronic message may be transmitted to the second device. Responsive to detecting a second trigger phrase in a second audio segment identified during the monitoring, a second electronic message comprising instructions to activate a microphone function of a third device may be generated and the second electronic message may be transmitted to the third device.

In an example, audio received via a microphone of a first device may be monitored. Responsive to detecting a trigger phrase in a first audio segment identified during the monitoring and a command in a second audio segment identified during the monitoring, an electronic message comprising instructions to perform an action associated with the command may be generated and the electronic message may be transmitted to a second device.

In an example, audio received via a microphone of a first device may be monitored. Responsive to detecting a trigger phrase in a first audio segment identified during the monitoring, a first electronic message comprising instructions to activate an input function of a second device may be generated and the first electronic message may be transmitted to the second device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
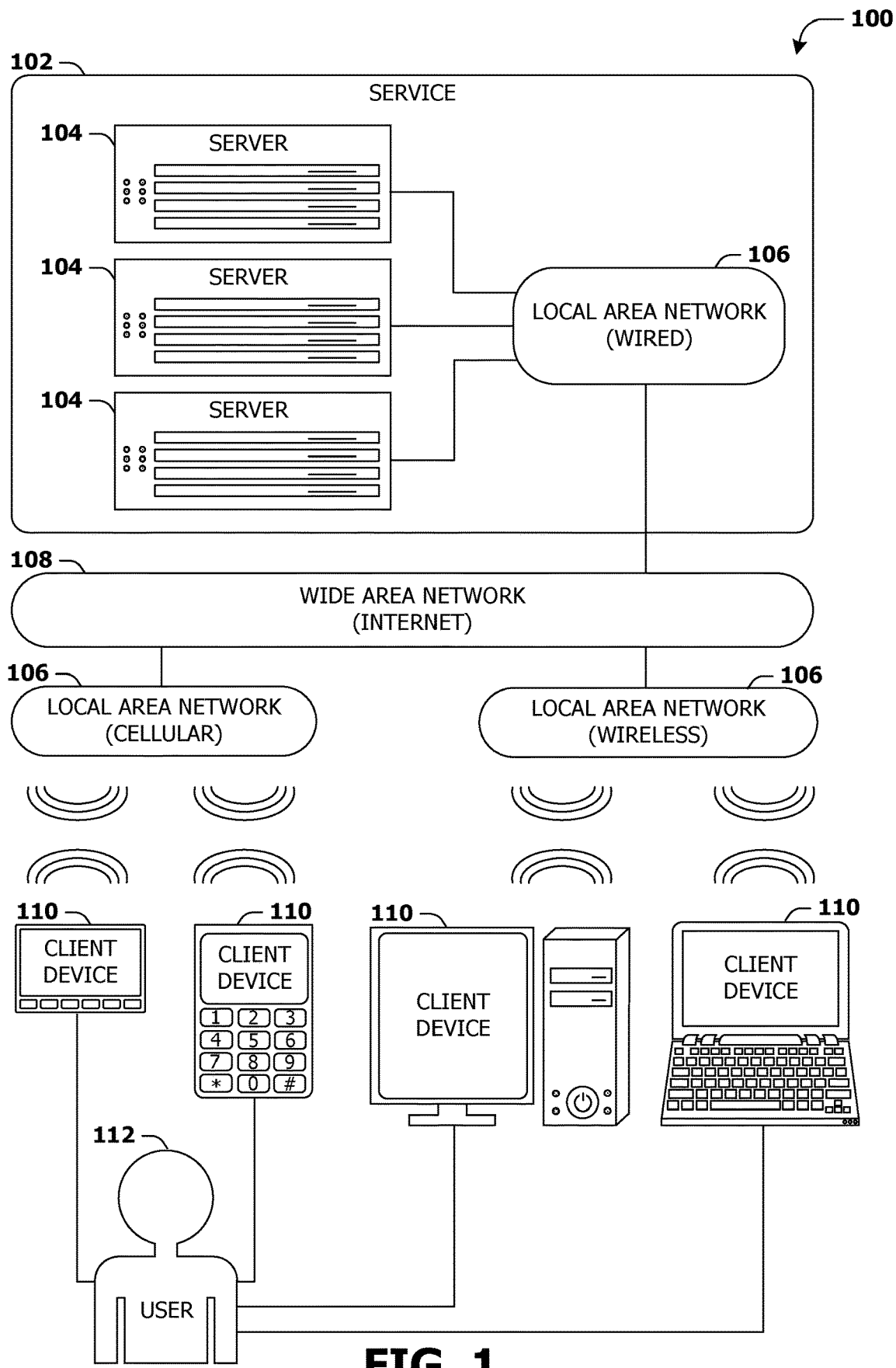
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
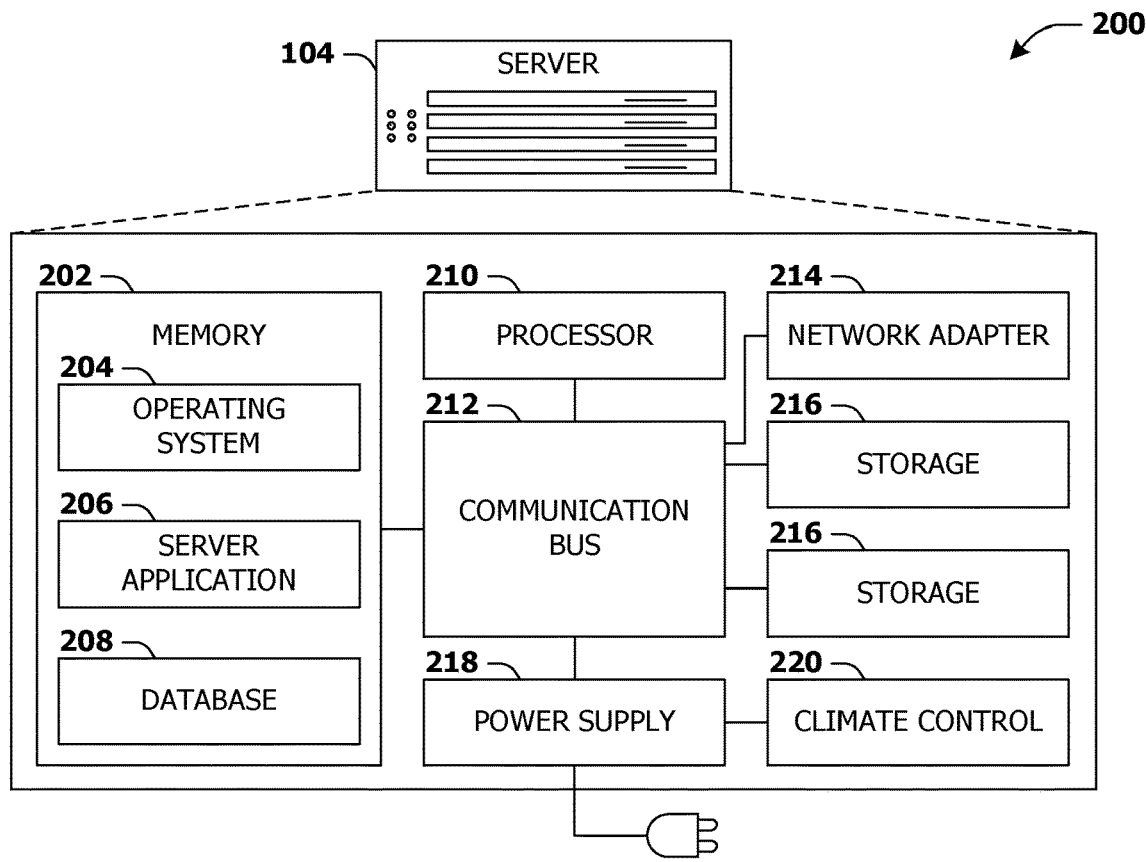
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
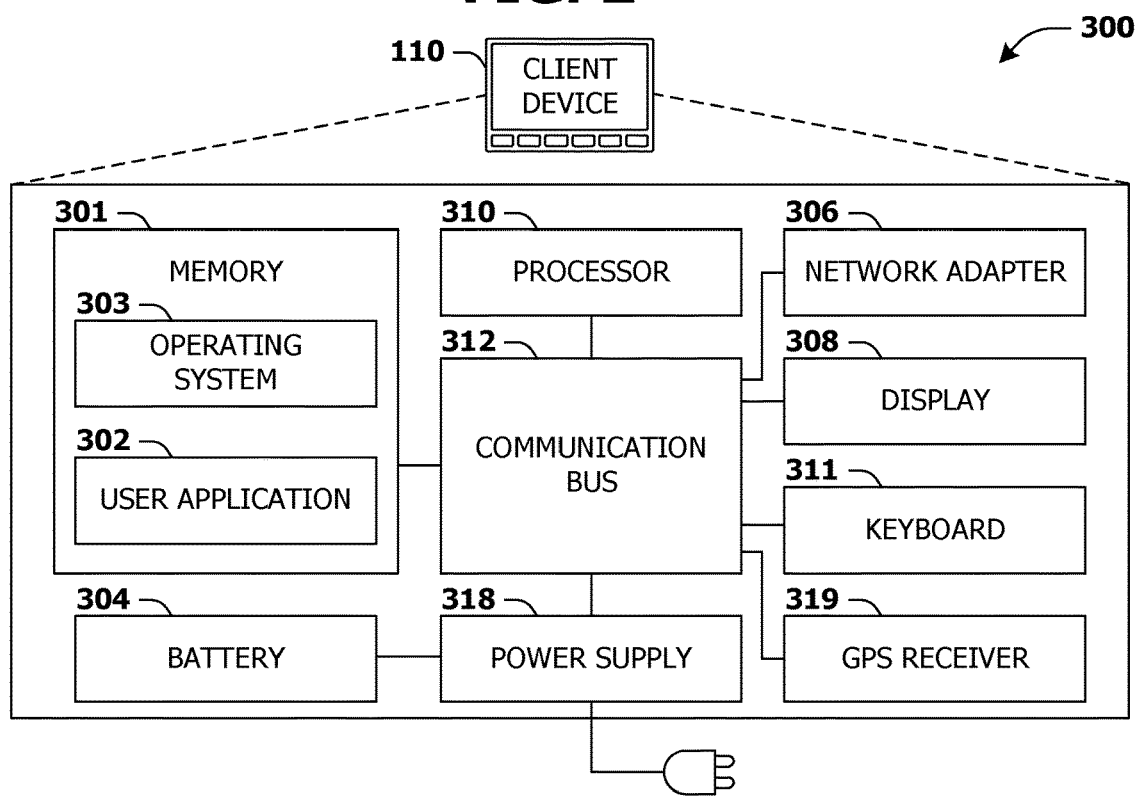
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for detecting trigger phrases and transmitting electronic messages to devices are provided. For example, many devices (e.g., smartphones, tablets, computers, smart speakers, voice command devices and/or other types of virtual assistant devices) may allow a user to provide a command (e.g., using a conversational interface) and/or may (e.g., then) perform an action based upon the command. Such a device may rely on detecting a trigger phrase (e.g., corresponding to a virtual assistant of the device) in order to activate the virtual assistant and/or receive the command. Accordingly, the device may continuously (e.g., constantly) monitor audio (e.g., of an area around the device) using a microphone (e.g., of the device).

However, the (e.g., continuous) monitoring may deplete a power source (e.g., a battery) of the device and/or the (e.g., continuous) monitoring of the device may compromise privacy and/or security of the user. For example, the device may be connected to the internet and/or one or more servers. Accordingly, the device may transmit one or more audio segments of the audio to the one or more servers (e.g., without knowledge and/or consent of the user). Alternatively and/or additionally, the audio may be accessed (e.g., and/or hacked) by entities via the internet.

Thus, in accordance with one or more of the techniques presented herein, a second device may monitor audio received via a second microphone of the second device. Responsive to detecting a trigger phrase, the second device may generate an electronic message comprising instructions to activate a microphone function of the device (e.g., and/or the virtual assistant of the device). The second device may (e.g., then) transmit the electronic message to the device. Accordingly, the device may not rely on continuously monitoring audio using the microphone of the device to detect the trigger phrase and/or activate the virtual assistant. The second device may be a trusted device that the user may believe does not compromise privacy and/or security of the user. In some examples, the second device may not be connected (e.g., directly) to the internet.

Figure 4A:
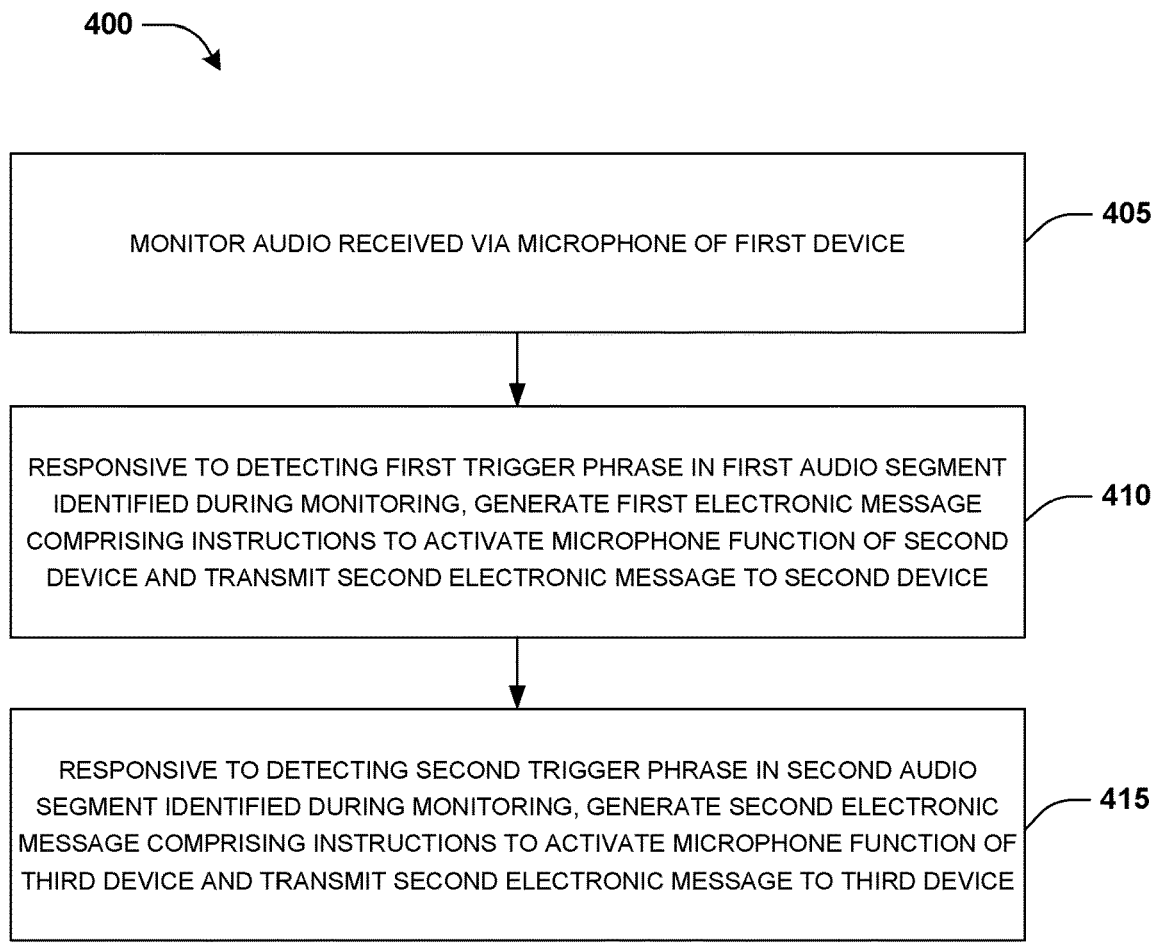
FIG. 4A is a flow chart illustrating an example method for detecting trigger phrases and transmitting electronic messages to devices.

An embodiment of detecting trigger phrases and transmitting electronic messages (e.g., associated with the trigger phrases) to devices is illustrated by an example method 400 of FIG. 4A. A user, such as user Jill, may access and/or interact with a plurality of virtual assistants using a plurality of devices (e.g., smartphones, tablets, computers, smart speakers, voice command devices, etc.). Each device of the plurality of devices may have a virtual assistant of the plurality of virtual assistants (e.g., installed) and/or may be connected to a first device. In some examples, the first device may interact with a second device (e.g., and/or activate a microphone function of the second device) of the plurality of devices responsive to detecting a first trigger phrase corresponding to the second device (e.g., while monitoring audio received via a first microphone of the first device). In some examples, the second device and/or the first trigger phrase may be (e.g., determined to be) associated with a first virtual assistant (e.g., and thus the first trigger phase may be determined to correspond to the second device). For example, the first virtual assistant may be installed onto the second device. Alternatively and/or additionally, the first device may interact with a third device (e.g., and/or activate a microphone function of the third device) of the plurality of devices responsive to detecting a second trigger phrase corresponding to the third device (e.g., while monitoring audio received via a first microphone of the first device). In some examples, the third device and/or the second trigger phrase may be (e.g., determined to be) associated with a second virtual assistant (e.g., and thus the second trigger phase may be determined to correspond to the third device). For example, the second virtual assistant may be installed onto the third device.

In some examples, the first device may be selected by the user. For example, the first device may be a trusted device that the user may believe does not compromise privacy and/or security of the user. In some examples, the first device may be selected using a device of the plurality of devices. For example, the second device may scan an environment such as a local area network, a personal area network, etc. The second device may then determine a second plurality of devices that are connected to the local area network, the personal area network, etc. The second plurality of devices may (e.g., then) be ranked based upon security. Alternatively and/or additionally, the second plurality of devices may be (e.g., further) ranked based upon a capability for monitoring audio and/or interacting with devices of the plurality of devices responsive to detecting trigger phrases corresponding to the devices. In an example, the first device may be ranked higher than a fourth device (e.g., of the second plurality of devices) because the first device may not be (e.g., continuously) connected to the internet and the fourth device may be (e.g., continuously) connected to the internet. In another example, the first device may be ranked higher than the fourth device because the first device is manufactured by a first manufacturer and the second device is manufactured by a second manufacturer, wherein the first manufacturer may be associated with a first security level (e.g., and/or a first trust level) and the second manufacturer may be associated with a second security level (e.g., and/or a second trust level). The first security level (e.g., and/or the first trust level) may be higher than the second security level (e.g., and/or the second trust level). In some examples, the first device may be ranked highest (e.g., of the second plurality of devices) and/or selected automatically by the second device. Alternatively and/or additionally, the second device may present a ranked list of the second plurality of devices. The first device may be selected by the user from the ranked list of the second plurality of devices.

In some examples, the first device may comprise a dedicated power source (e.g., a battery) and/or may be connected to a power supply and/or an adaptor. In some examples, the first device (e.g., and/or the second plurality of devices) may comprise an (e.g., home) appliance and/or an (e.g., consumer) electronic device, such as a television, a video game console, a laptop, a desktop computer, a motor-vehicle computer, a smartphone, a tablet, an e-reader, etc. Alternatively and/or additionally, the first device (e.g., and/or the second plurality of devices) may be configured and/or manufactured specifically for monitoring audio received via the first microphone and/or interacting with devices of the plurality of devices responsive to detecting trigger phrases corresponding to the devices.

In some examples, the first device may be configured to connect to the internet and/or access one or more servers (e.g., accessed by the first device via a network connection). In some examples, the first device may have various security settings. A high security setting may require that the first device does not connect to (e.g., and/or access) the internet. A medium security setting may require that the first device connects to (e.g., and/or accesses) the internet (e.g., only) for voice recognition information. A low security setting may allow the first device to connect to the internet for voice recognition information and/or to receive and/or transmit (e.g., other types of) information using the internet. In some examples, the security settings may be changed (e.g., by the user) by using a security interface.

At 405, audio received via the first microphone of the first device may be monitored (e.g., by the first device). For example, the first microphone may be (e.g., continuously) active and/or may receive audio of an area around the first microphone (e.g., and/or the first device). In some examples, the first device may be configured to detect speech during the monitoring of the audio. Responsive to detecting speech, an audio segment comprising the speech may be extracted and/or analyzed and the audio segment may be compared to a plurality of trigger phrases associated with the plurality of devices and/or the plurality of virtual assistants. For example, each trigger phrase of the plurality of trigger phrases may be associated with a device of the plurality of devices and/or a virtual assistant of the plurality of virtual assistants. Responsive to determining that the audio segment does not comprise speech similar to (e.g., any trigger phrase of) the plurality of trigger phrases, the audio segment may be discarded (e.g., and/or the first device may continue monitoring audio received via the first microphone).

In some examples, information associated with the plurality of trigger phrases may be comprised within a voice recognition database. The voice recognition database may comprise voice recognition information corresponding to the plurality of trigger phrases. For example, the voice recognition database may comprise a data structure of the plurality of trigger phrases, wherein each trigger phrase of the trigger phrases is linked to a set of voice recognition information of the trigger phrase. In some examples, the voice recognition database may be stored in one or more servers accessed by the first device via a network connection. Alternatively and/or additionally, the voice recognition database may be stored in a memory device of the first device. In some examples, voice recognition information may be extracted from the voice recognition database to compare the audio segment to the plurality of trigger phrases.

At 410, responsive to detecting the first trigger phrase in a first audio segment identified during the monitoring, a first electronic message may be generated. The first electronic message may (e.g., then) be transmitted to the second device. The first electronic message may comprise instructions to activate a microphone function (e.g., and/or an input function) of the second device. In some examples, the first electronic message may comprise a first push notification.

In some examples, at least a portion of the first audio segment may be compared with (e.g., each trigger phrase of) the plurality of trigger phrases. For example, the first device may determine that the first audio segment comprises speech similar to the first trigger phrase. In an example, the first device may determine that the first audio segment comprises speech 89% similar to the first trigger phrase and/or the first audio segment comprises speech 12% similar to the second trigger phrase. In this example, the first trigger phrase may be identified based upon the determination that the first audio segment comprises speech 89% similar to the first trigger phrase. For example, the first trigger phrase may be identified responsive to determining that a similarity of at least a portion of the first audio segment and the first trigger phrase is above a trigger phrase threshold (e.g., 70%, 80%, 85%, 90%, etc.). In some examples, responsive to identifying the first trigger phrase, the first device may stop comparing the first audio segment with trigger phrases of the plurality of trigger phrases.

In some examples, each trigger phrase of the plurality of trigger phrases may be associated with a device of the plurality of devices. For example, the first trigger phrase may be associated with the second device. Accordingly, the second device may be selected (e.g., for transmission of the first electronic message) from amongst the plurality of devices based upon the first trigger phrase. Alternatively and/or additionally, each trigger phrase may be associated with a virtual assistant of the plurality of virtual assistants. Accordingly, the first virtual assistant may be selected from amongst the plurality of virtual assistants based upon the first trigger phrase. Further, the second device may be selected from amongst the plurality of devices based upon the first virtual assistant.

In some examples, the first electronic message may (e.g., further) comprise instructions to activate a speaker function of the second device and/or a screen function of the second device. In some examples, the first electronic message may (e.g., merely) comprise an indication that the first trigger phrase was detected. The second device may interpret the indication that the first trigger phrase was detected as instructions (e.g., and/or a trigger) to activate the microphone function of the second device, instructions (e.g., and/or a trigger) to activate the input function of the second device (e.g., such as a camera function), instructions (e.g., and/or a trigger) to activate the speaker function of the second device and/or instructions (e.g., and/or a trigger) to activate the screen function of the second device.

Responsive to receiving the first electronic message, the second device may prompt the user to provide a first command to the second device. For example, the second device may activate (e.g., turn on) a screen of the second device, display a first graphical object using the screen of the second device, output a first audio message and/or a first sound effect using a speaker of the second device, activate a first camera of the second device (e.g., in order to receive the first command) and/or activate a second microphone of the second device (e.g., in order to receive the first command). In an example, the first graphical object, the first audio message and/or the first sound effect may indicate to the user that the second device is ready to receive the first command via the first camera and/or the second microphone. For example, the first graphical object (e.g., displayed on the screen of the second device) may comprise "Listening for your command" and/or the first audio message (e.g., outputted using the speaker of the second device) may comprise "Please state your command". The second device may (e.g., then) receive the first command using the second microphone, using the first camera of the second device and/or via text received using a keyboard (e.g., and/or an on-screen keyboard) of the second device. The second device may (e.g., then) perform a first action based upon the first command.

At 415, responsive to detecting the second trigger phrase in a second audio segment identified during the monitoring, a second electronic message of the third device may be generated. The second electronic message may (e.g., then) be transmitted to the third device. The second electronic message may comprise instructions to activate a microphone function (e.g., and/or an input function). In some examples, the second electronic message may comprise a second push notification.

In some examples, at least a portion of the second audio segment may be compared with (e.g., each trigger phrase of) the plurality of trigger phrases. For example, the first device may determine that the second audio segment comprises speech similar to the second trigger phrase. In an example, the first device may determine that the second audio segment comprises speech 93% similar to the second trigger phrase and/or the second audio segment comprises speech 13% similar to the first trigger phrase. In this example, the second trigger phrase may be identified based upon the determination that the second audio segment comprises speech 93% similar to the second trigger phrase. For example, the second trigger phrase may be identified responsive to determining that a similarity of at least a portion of the second audio segment and the second trigger phrase is above the trigger phrase threshold. In some examples, responsive to identifying the second trigger phrase, the first device may stop comparing the second audio segment with trigger phrases of the plurality of trigger phrases. In some examples, the second virtual assistant and/or the third device may be selected based upon the second trigger phrase.

In some examples, the second electronic message may (e.g., further) comprise instructions to activate a speaker function of the third device and/or a screen function of the third device. In some examples, the second electronic message may (e.g., merely) comprise an indication that the second trigger phrase was detected. The third device may interpret the indication that the second trigger phrase was detected as instructions (e.g., and/or a trigger) to activate the microphone function of the third device, instructions (e.g., and/or a trigger) to activate the input function of the third device (e.g., such as a camera function), instructions (e.g., and/or a trigger) to activate the speaker function of the third device and/or instructions (e.g., and/or a trigger) to activate the screen function of the third device.

Responsive to receiving the second electronic message, the third device may prompt the user to provide a second command to the third device. For example, the third device may activate (e.g., turn on) a screen of the third device, display a second graphical object using the screen of the third device, output a second audio message and/or a second sound effect using a speaker of the third device, activate a second camera of the third device (e.g., in order to receive the second command) and/or activate a third microphone of the third device (e.g., in order to receive the second command). In an example, the second graphical object, the second audio message and/or the second sound effect may indicate to the user that the third device is ready to receive the second command via the second camera and/or the third microphone. The third device may (e.g., then) receive the first command using the third microphone, using the second camera and/or via text received using a keyboard (e.g., and/or an on-screen keyboard) of the third device. The third device may (e.g., then) perform a second action based upon the second command.

In some examples, the first device, the second device and/or the third device may be connected to the local area network (e.g., via Ethernet, Wi-Fi, etc.). Accordingly, the first device may transmit the first electronic message to the second device via the local area network. Alternatively and/or additionally, the first device may transmit the second electronic message to the third device via the local area network. Alternatively and/or additionally, the first device may be connected to the second device using a first wireless connection (e.g., a Bluetooth connection, a personal area network, etc.). For example, the first device may be paired to the second device using Bluetooth. Accordingly, the first device may transmit the first electronic message to the second device using the first wireless connection. Alternatively and/or additionally, the first device may be connected to the third device using a second wireless connection (e.g., a Bluetooth connection, a personal area network, etc.). For example, the first device may be paired to the third device using Bluetooth. Accordingly, the first device may transmit the second electronic message to the third device using the second wireless connection.

Figure 4B:
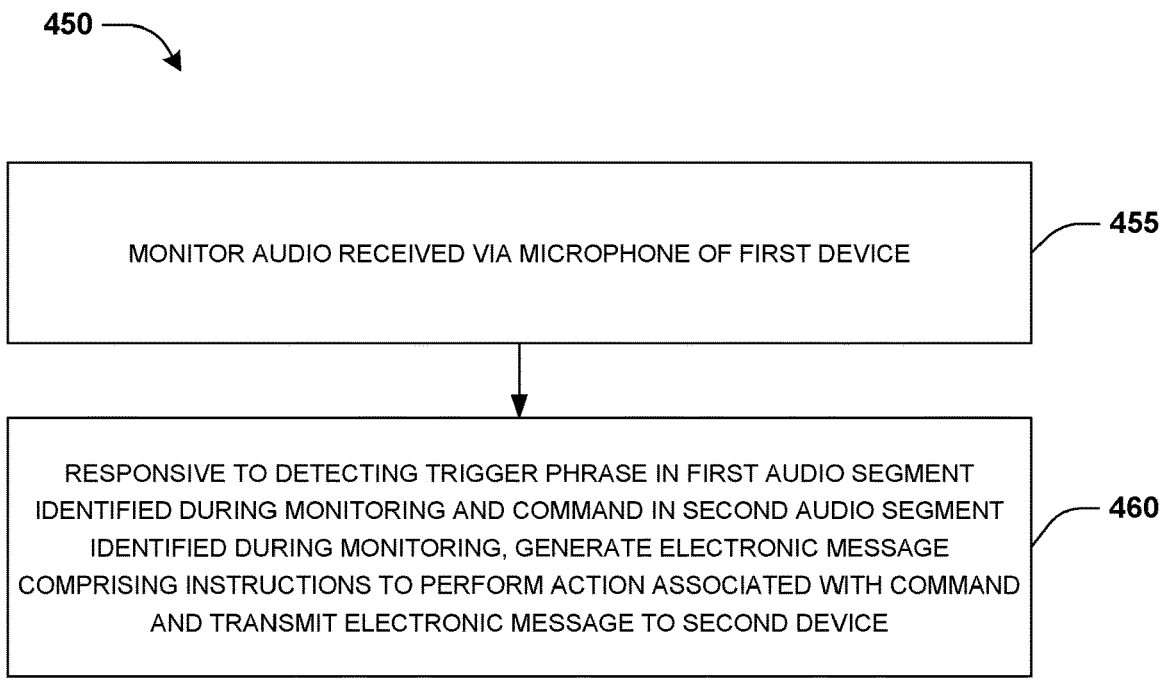
FIG. 4B is a flow chart illustrating an example method for detecting trigger phrases, detecting commands and transmitting electronic messages to devices.

An embodiment of detecting trigger phrases, detecting commands and/or transmitting electronic messages to devices is illustrated by an example method 450 of FIG. 4B. A user, such as user Jack, may access and/or interact with a plurality of virtual assistants using a plurality of devices (e.g., smartphones, tablets, computers, smart speakers, voice command devices, etc.). Each device of the plurality of devices may have a virtual assistant of the plurality of virtual assistants (e.g., installed) and/or may be connected to a first device. In some examples, the first device may interact with a second device of the plurality of devices responsive to detecting a first trigger phrase and/or a first command corresponding to the second device (e.g., while monitoring audio received via a first microphone of the first device). In some examples, the second device and/or the first trigger phrase may be associated with a first virtual assistant. For example, the first virtual assistant may be installed onto the second device.

In some examples, the first device may be selected by the user. In some examples, the first device may be a trusted device that the user may believe does not compromise privacy of the user. In some examples, the first device may comprise a dedicated power source (e.g., a battery) and/or may be connected to a power supply and/or an adaptor. In some examples, the first device may be selected automatically using a device of the plurality of devices.

In some examples, the first device may be configured to connect to the internet and/or access one or more servers for voice recognition information. In some examples, the first device may have various security settings. A high security setting may require that the first device does not connect to (e.g., and/or access) the internet. A medium security setting may require that the first device connects to (e.g., and/or accesses) the internet (e.g., only) for voice recognition information. A low security setting may allow the first device to connect to the internet for voice recognition information and/or to receive and/or transmit (e.g., other types of) information using the internet.

At 455, audio received via the first microphone of the first device may be monitored (e.g., by the first device). For example, the first microphone may be (e.g., continuously) active and/or may receive audio of an area around the first microphone (e.g., and/or the first device). In some examples, the first device may be configured to detect speech during the monitoring of the audio. Responsive to detecting speech, an audio segment comprising the speech may be analyzed and/or extracted and the audio segment may be compared to a plurality of trigger phrases associated with the plurality of devices and/or the plurality of virtual assistants. For example, each trigger phrase of the plurality of trigger phrases may be associated with a device of the plurality of devices and/or a virtual assistant of the plurality of virtual assistants. Responsive to determining that the audio segment does not comprise speech similar to (e.g., any trigger phrase of) the plurality of trigger phrases, the audio segment may be discarded (e.g., and/or the first device may continue monitoring audio received via the first microphone).

At 460, responsive to detecting the first trigger phrase in a first audio segment identified during the monitoring and the first command in a second audio segment identified during the monitoring, a first electronic message may be generated. The first electronic message may be transmitted to the second device. The first electronic message may comprise instructions to perform an action associated with the first command. In some examples, the first electronic message may comprise a first push notification. In some examples, at least a portion of the first audio segment may be compared with (e.g., each trigger phrase of) the plurality of trigger phrases. For example, the first device may determine that the first audio segment comprises speech similar to the first trigger phrase. In some examples, responsive to detecting the first trigger phrase, the first device may prompt the user to provide the first command to the first device. For example, the first device may display a first graphical object using a screen of the first device and/or output a first audio message and/or a first sound effect using a speaker of the first device. Alternatively and/or additionally, the first device may detect the first trigger phrase and the first command within a threshold period of time and/or with less than a threshold number of words between the first trigger phrase and the first command (e.g., consecutively) and/or may not prompt the user to provide the first command to the first device.

The first device may (e.g., continue) monitoring audio received via the first microphone to detect the first command in the second audio segment. In some examples, responsive to detecting the first command in the second audio segment identified during the monitoring, the second audio segment may be transcribed to generate a text transcription (e.g., of the second audio segment). In some examples, the second audio segment may be transcribed using voice recognition information. The voice recognition information may be comprised within a voice recognition database. In some examples, the voice recognition database may be stored in one or more servers accessed by the first device via a network connection. Alternatively and/or additionally, the voice recognition database may be stored in a memory device of the first device. In some examples, voice recognition information may be extracted from the voice recognition database to transcribe the second audio segment. In some examples, the voice recognition database may be exclusive (e.g., generated and/or maintained exclusively) for the user. In some examples, the voice recognition database may be dynamically updated to add new voice recognition information (e.g., based upon analyzing speech of the user, by receiving the new voice recognition information from one or more servers accessed by the first device via a network connection, by receiving the new voice recognition information from the second device, etc.).

In some examples, the first command may be determined by the first device based upon an evaluation of the text transcription. Alternatively and/or additionally, the instructions to perform the action may comprise the text transcription (e.g., of the second audio segment). In an example, the second audio segment may comprise the user saying, "Give me directions to Brooklyn Park". Accordingly, the second audio segment may be transcribed to generate the text transcription comprising, "Give me directions to Brooklyn Park". The first electronic message (e.g., and/or the instructions to perform the action) may comprise (e.g., a representation of) the text transcription.

In some examples, the second audio segment may not be transcribed (e.g., to generate the text transcription) by the first device. For example, the first device may generate an audio file based upon the second audio segment. In some examples, the first electronic message (e.g., and/or the instructions to perform the action) may comprise the audio file rather than the text transcription. In some examples, the second device may transcribe the audio file to generate the text transcription.

In some examples, each trigger phrase of the plurality of trigger phrases may be associated with a device of the plurality of devices. For example, the first trigger phrase may be associated with the second device. Accordingly, the second device may be selected (e.g., for transmission of the first electronic message) from amongst the plurality of devices based upon the first trigger phrase. Alternatively and/or additionally, the second device may be selected (e.g., for transmission of the first electronic message) from amongst the plurality of devices based upon an analysis of the first command. For example, the first device may analyze the first command, the second audio segment, the text transcription and/or the audio file to determine a context, a subject matter, etc. of the first command. The second device may (e.g., then) be selected based upon a determination that the second device is (e.g., best) fit for performing the action responsive to receiving the first electronic message.

In some examples, responsive to receiving the first electronic message, the second device may perform the action. For example, the second device may activate a screen of the second device, display a second graphical object associated with the action using the screen of the second device and/or output a second audio message associated with the action using a speaker of the second device. In an example, responsive to receiving the first electronic message, the second device may display the second graphical object comprising a map interface and/or GPS directions corresponding to the first electronic message and/or the second device may output the second audio message corresponding to the first electronic message using the speaker of the second device, comprising "Here are directions to Brooklyn Park".

Alternatively and/or additionally, the second device may output an inquiry associated with the action using the speaker of the second device and/or the screen of the second device. In an example, responsive to receiving the first electronic message comprising "Give me directions to Brooklyn Park", the second device may output an inquiry using the speaker of the second device comprising "Did you mean Brooklyn Park in New York City or Brooklyn Park in Kansas City?". In some examples, the second device may transmit a second electronic message to the first device comprising instructions to monitor audio received via the first microphone of the first device to detect a second command, associated with the first command.

Alternatively and/or additionally, the second device may not transmit the second electronic message to the first device. For example, the first trigger phrase may be detected by the first device (e.g., after the inquiry is outputted by the speaker of the second device). Responsive to receiving the second electronic message and/or detecting the first trigger phrase, the first device may monitor audio received via the first microphone of the first device to detect the second command. In some examples, responsive to detecting the second command in a third audio segment identified during the monitoring, the first device may generate a third electronic message comprising instructions to perform a second action associated with the second command. In some examples, the third electronic message may comprise a third push notification.

In some examples, the third audio segment may be transcribed to generate a second text transcription (e.g., of the third audio segment). In some examples, the third electronic message (e.g., and/or the instructions to perform the second action) may comprise the second text transcription. In an example, the third audio segment may comprise the user saying, "New York City". Accordingly, the third audio segment may be transcribed to generate the second text transcription comprising, "New York City".

In some examples, the third audio segment may not be transcribed (e.g., to generate the second text transcription) by the first device. For example, the first device may generate a second audio file based upon the third audio segment. In some examples, the third electronic message (e.g., and/or the instructions to perform the second action) may comprise the second audio file rather than the second text transcription. In some examples, the second device may transcribe the second audio file to generate the second text transcription.

The first device may transmit the third electronic message to the second device. In some examples, responsive to receiving the third electronic message, the second device may perform the second action. For example, the second device may activate the screen of the second device, display a fourth graphical object associated with the second action using the screen of the second device and/or output a third audio message associated with the second action using a speaker of the second device. In an example, the second device may display the fourth graphical object comprising a map interface and/or GPS directions corresponding to the third electronic message. The second device may (e.g., further) output the third audio message corresponding to the third electronic message using the speaker of the second device, comprising "Here are directions to Brooklyn Park in New York City".

In some examples, the first device may interact with a third device of the plurality of devices responsive to detecting a second trigger phrase and/or a third command corresponding to the third device. In some examples, the third device and/or the second trigger phrase may be associated with a second virtual assistant. For example, the second virtual assistant may be installed onto the third device.

Responsive to detecting the second trigger phrase in a fourth audio segment identified during the monitoring and the third command in a fifth audio segment identified during the monitoring, a fourth electronic message may be generated. The fourth electronic message may (e.g., then) be transmitted to the third device. The fourth electronic message may comprise instructions to perform a third action associated with the third command. In some examples, the fourth electronic message may comprise a fourth push notification.

In some examples, at least a portion of the fourth audio segment may be compared with (e.g., each trigger phrase of) the plurality of trigger phrases. For example, the first device may determine that the fourth audio segment comprises speech similar to the second trigger phrase. In some examples, responsive to detecting the second trigger phase, the first device may prompt the user to provide the third command to the first device. For example, the first device may display a fifth graphical object using the screen of the first device and/or output a fourth audio message and/or a second sound effect using the speaker of the first device.

The first device may (e.g., continue) monitoring audio received via the first microphone to detect the third command in the fifth audio segment. In some examples, responsive to detecting the third command, the fifth audio segment may be transcribed to generate a third text transcription (e.g., of the fifth audio segment). In some examples, the fourth electronic message (e.g., and/or the instructions to perform the third action) may comprise the third text transcription. In some examples, the fifth audio segment may not be transcribed (e.g., to generate the third transcription) by the first device. For example, the first device may generate a third audio file based upon the fifth audio segment. In some examples, the fourth electronic message (e.g., and/or the instructions to perform the third action) may comprise the third audio file rather than the third text transcription. In some examples, the third device may transcribe the third audio file to generate the third text transcription. In an example, the fifth audio segment may comprise the user saying, "Please read me my unread text messages".

In some examples, the second trigger phrase may be associated with the third device. Accordingly, the third device may be selected (e.g., for transmission of the fourth electronic message) from amongst the plurality of devices based upon the second trigger phrase.

Alternatively and/or additionally, the third device may be selected (e.g., for transmission of the fourth electronic message) from amongst the plurality of devices based upon an analysis of the third command. For example, the first device may analyze the third command, the fifth audio segment, the third text transcription and/or the third audio file to determine a context, a subject matter, etc. of the third command. The third device may (e.g., then) be selected based upon a determination that the third device is (e.g., best) fit and/or match (e.g., relative to one or more other devices) for performing the third action responsive to receiving the fourth electronic message. The fit and/or match of each device may be determined (e.g., scored) based upon one or more criteria, which may be retrieved from a database, or (e.g., manually) input/defined by a user.

In some examples, responsive to receiving the fourth electronic message, the third device may perform the third action. For example, the third device may activate a screen of the third device, display a sixth graphical object associated with the third action using the screen of the third device, and/or output a fifth audio message associated with the third action using a speaker of the third device. In an example, responsive to receiving the fourth electronic message, the third device may display the sixth graphical object comprising a list of unread text messages (e.g., comprising one or more unread text messages received by the third device) and/or the third device may output one or more audio messages using the speaker of the second device, wherein each audio message of the one or more audio messages may correspond to an unread text message of the one or more unread text messages.

In an example, the first device may detect the first trigger phrase, the first command, the second trigger phrase and/or the third command, consecutively. For example, while the second device performs the first action (e.g., and/or the second action), the first device may detect the second trigger phrase and/or the third command. Accordingly, the first device may transmit the fourth electronic message (e.g., corresponding to the third command) to the third device while the second device performs the first action (e.g., and/or the second action). In this way, the first action (e.g., and/or the second action) may be performed by the second device and the third action may be performed by the third device, simultaneously.

In some examples, the first device, the second device and/or the third device may be connected to a local area network (e.g., via Ethernet, Wi-Fi, etc.). Accordingly, the first device may transmit the first electronic message and/or the third electronic message to the second device via the local area network. Alternatively and/or additionally, the second device may transmit the second electronic message to the first device via the local area network. Alternatively and/or additionally, the first device may transmit the fourth electronic message to the third device via the local area network. Alternatively and/or additionally, the first device may be connected to the second device using a first wireless connection (e.g., a Bluetooth connection, a personal area network, etc.). For example, the first device may be paired to the second device using Bluetooth. Accordingly, the first device may transmit the first electronic message and/or the third electronic message to the second device using the first wireless connection. Alternatively and/or additionally, the second device may transmit the second electronic message to the first device using the first wireless connection. Alternatively and/or additionally, the first device may be connected to the third device using a second wireless connection (e.g., a Bluetooth connection, a personal area network, etc.). For example, the first device may be paired to the third device using Bluetooth. Accordingly, the first device may transmit the fourth electronic message to the third device using the second wireless connection.

Figure 5A:
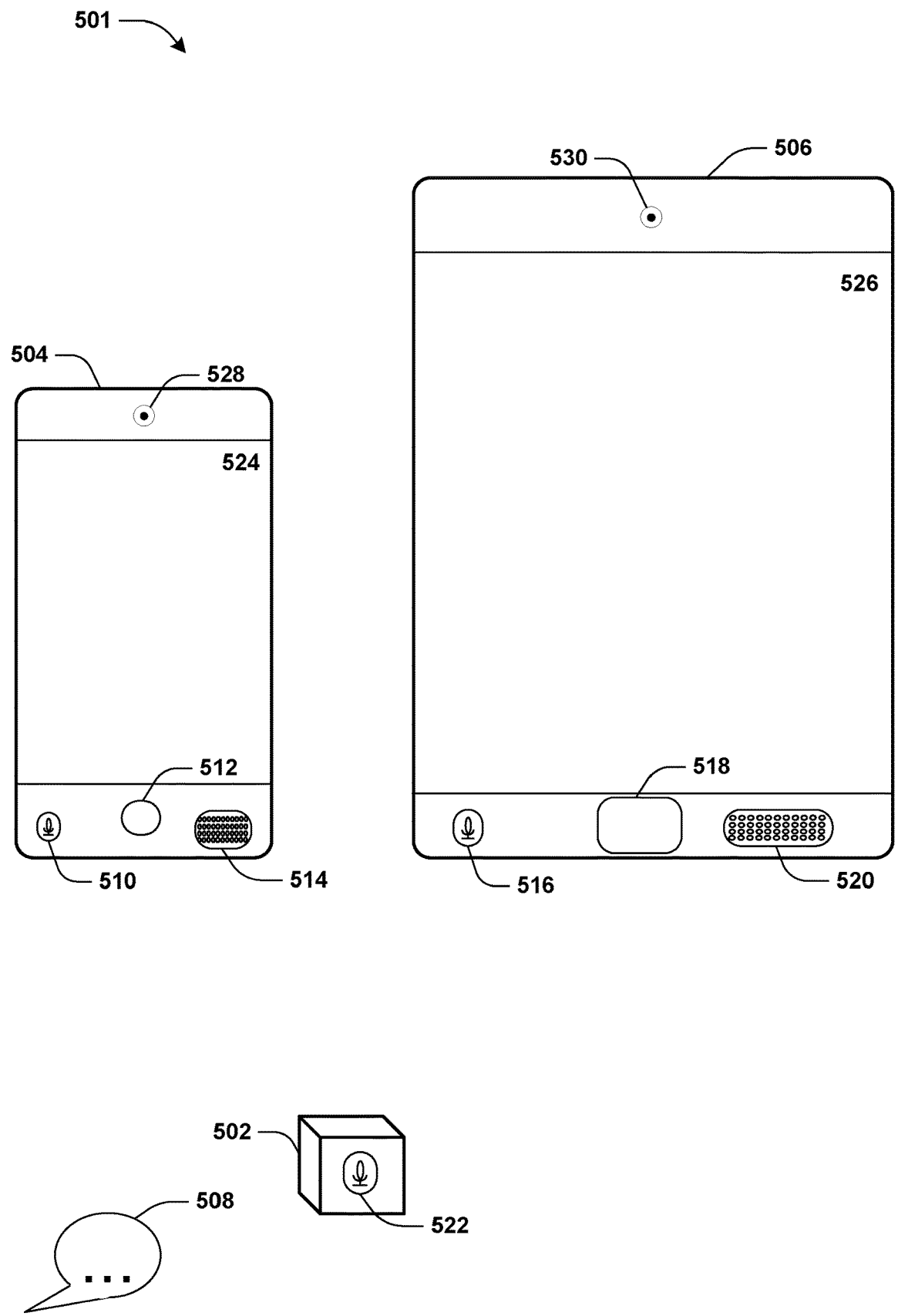
FIG. 5A is a component block diagram illustrating an example system for detecting a trigger phrase and transmitting an electronic message to a device, where a second trigger phrase in a first audio segment is detected.
Figure 5B:
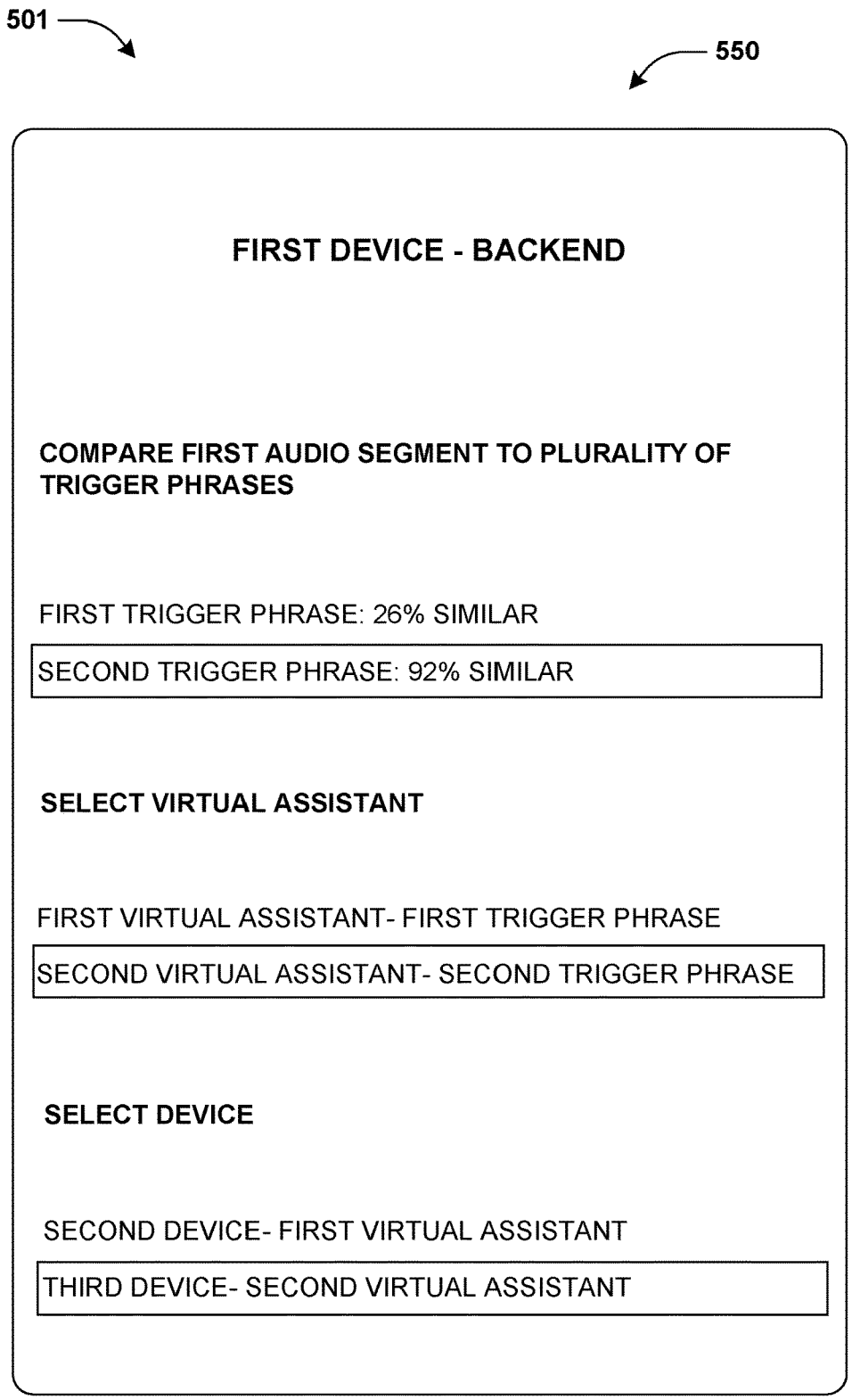
FIG. 5B is a component block diagram illustrating an example system for detecting a trigger phrase and transmitting an electronic message to a device, where a first audio segment is compared to a first trigger phrase and/or a second trigger phrase.
Figure 5C:
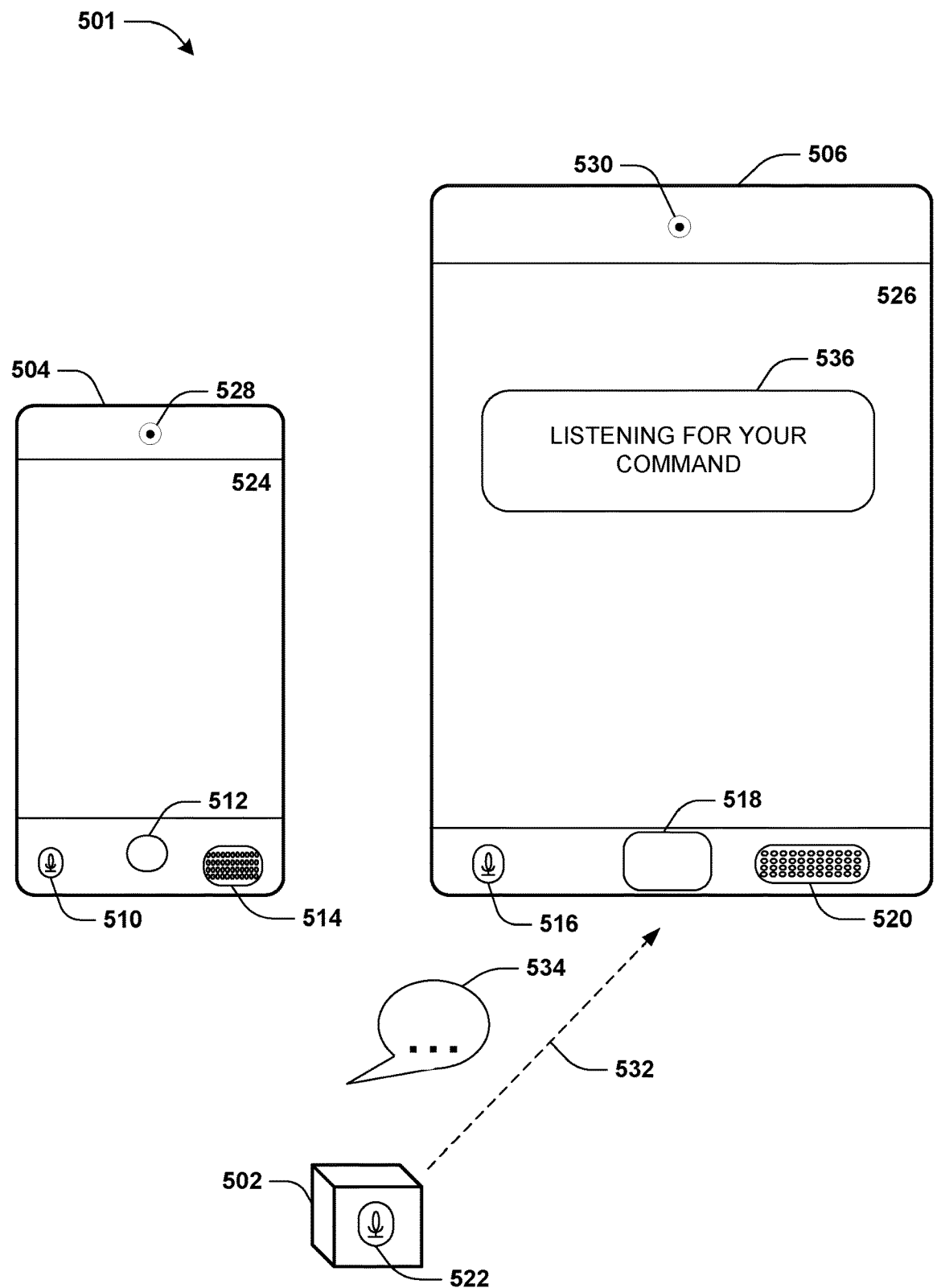
FIG. 5C is a component block diagram illustrating an example system for detecting a trigger phrase and transmitting an electronic message to a device, where a first electronic message is transmitted to a third device.

FIGS. 5A-5C illustrate examples of a system 501 for detecting a trigger phrase and transmitting an electronic message (e.g., associated with the trigger phrase) to a device. A user, such as user James, may access and/or interact with a plurality of virtual assistants using a plurality of devices (e.g., smartphones, tablets, computers, smart speakers, voice command devices, etc.). Each device of the plurality of devices may have a virtual assistant of the plurality of virtual assistants (e.g., installed) and/or may be connected to a first device 502. The first device 502 may monitor audio received via a first microphone 522 of the first device 502. The plurality of devices may comprise a second device 504 (e.g., a smartphone) associated with a first virtual assistant (e.g., of the plurality of virtual assistants), a third device 506 (e.g., a tablet) associated with a second virtual assistant (e.g., of the plurality of virtual assistants) and/or one or more (e.g., other) devices associated with one or more (e.g., other) virtual assistants.

The second device 504 may comprise a camera 528, a screen 524, a microphone 510, a button 512 and/or a speaker

514. Alternatively and/or additionally, the third device 506 may comprise a camera 530, a screen 526, a microphone 516, a button 518 and/or a speaker 520. In some examples, the second device 504 and/or the first virtual assistant may be associated with a first trigger phrase of a plurality of trigger phrases corresponding to the plurality of virtual assistants. Alternatively and/or additionally, the third device 506 and/or the second virtual assistant may be associated with a second trigger phrase of the plurality of trigger phrases. The first trigger phrase may comprise "Hello Alpha" and the second trigger phrase may comprise "Hey Beta".

FIG. 5A illustrates the first device 502 detecting the second trigger phrase in a first audio segment 508 identified during the monitoring. For example, the first audio segment 508 may comprise the user saying "Hey Beta". In some examples, at least a portion of the first audio segment 508 may be compared with (e.g., each trigger phrase of) the plurality of trigger phrases (e.g., associated with the plurality of virtual assistants).

FIG. 5B illustrates a backend system 550 (e.g., on the first device 502, on a server connected to the first device 502 via a network, etc.) that may compare the first audio segment 508 to the first trigger phrase and/or the second trigger phrase. For example, the first audio segment 508 may be compared to the first trigger phrase to determine that the first audio segment 508 comprises speech 26% similar to the first trigger phrase. Alternatively and/or additionally, the first audio segment 508 may be compared to the second trigger phrase to determine that the first audio segment 508 comprises speech 92% similar to the second trigger phrase. Accordingly, the second trigger phrase may be identified responsive to determining that a similarity of at least a portion of the first audio segment 508 and the second trigger phrase is above a trigger phrase threshold (e.g., 85%). The second virtual assistant may be selected (e.g., from amongst the plurality of virtual assistants) based upon the second trigger phrase. Alternatively and/or additionally, the third device 506 may be selected (e.g., from amongst the plurality of devices) based upon the second virtual assistant (e.g., and/or the second trigger phrase).

FIG. 5C illustrates the first device 502 transmitting a first electronic message 532 to the third device 506. In some examples, the first device 502 may generate the first electronic message 532 comprising instructions to activate an input function of the third device 506. The first electronic message 532 may comprise a first push notification. The first electronic message 532 may (e.g., further) comprise instructions to activate a speaker function of the third device 506 and/or a screen function of the third device 506. Alternatively and/or additionally, the first electronic message 532 may (e.g., merely) comprise an indication that the second trigger phrase was detected. The third device 506 may interpret the indication that the second trigger phrase was detected as instructions (e.g., and/or a trigger) to activate the microphone 516, instructions (e.g., and/or a trigger) to activate the camera 530, instructions (e.g., and/or a trigger) to activate the speaker 520 and/or instructions (e.g., and/or a trigger) to activate the screen 526.

Responsive to receiving the first electronic message 532, the third device 506 may prompt the user to provide a first command to the third device 506. For example, the third device may activate (e.g., turn on) the screen 526, display a first graphical object 536 using the screen 526, output a first audio message and/or a first sound effect using the speaker 520, activate the camera 530 (e.g., in order to receive the first command) and/or activate the microphone 516 (e.g., in order to receive the first command). In an example, the first graphical object 536, the first audio message and/or the first sound effect may indicate to the user that the third device 506 is ready to receive the first command. For example, the first graphical object 536 may comprise "LISTENING FOR YOUR COMMAND" and/or the first audio message (e.g., outputted using the speaker 520) may comprise "Please state your command". The third device 506 may (e.g., then) receive the first command in a second audio segment 534 using the microphone 516. Alternatively and/or additionally, the third device 506 may receive the first command using the camera 530 and/or via text received using a keyboard (e.g., and/or an on-screen keyboard) of the third device 506. The third device 506 may (e.g., then) perform a first action based upon the first command.

Figure 6A:
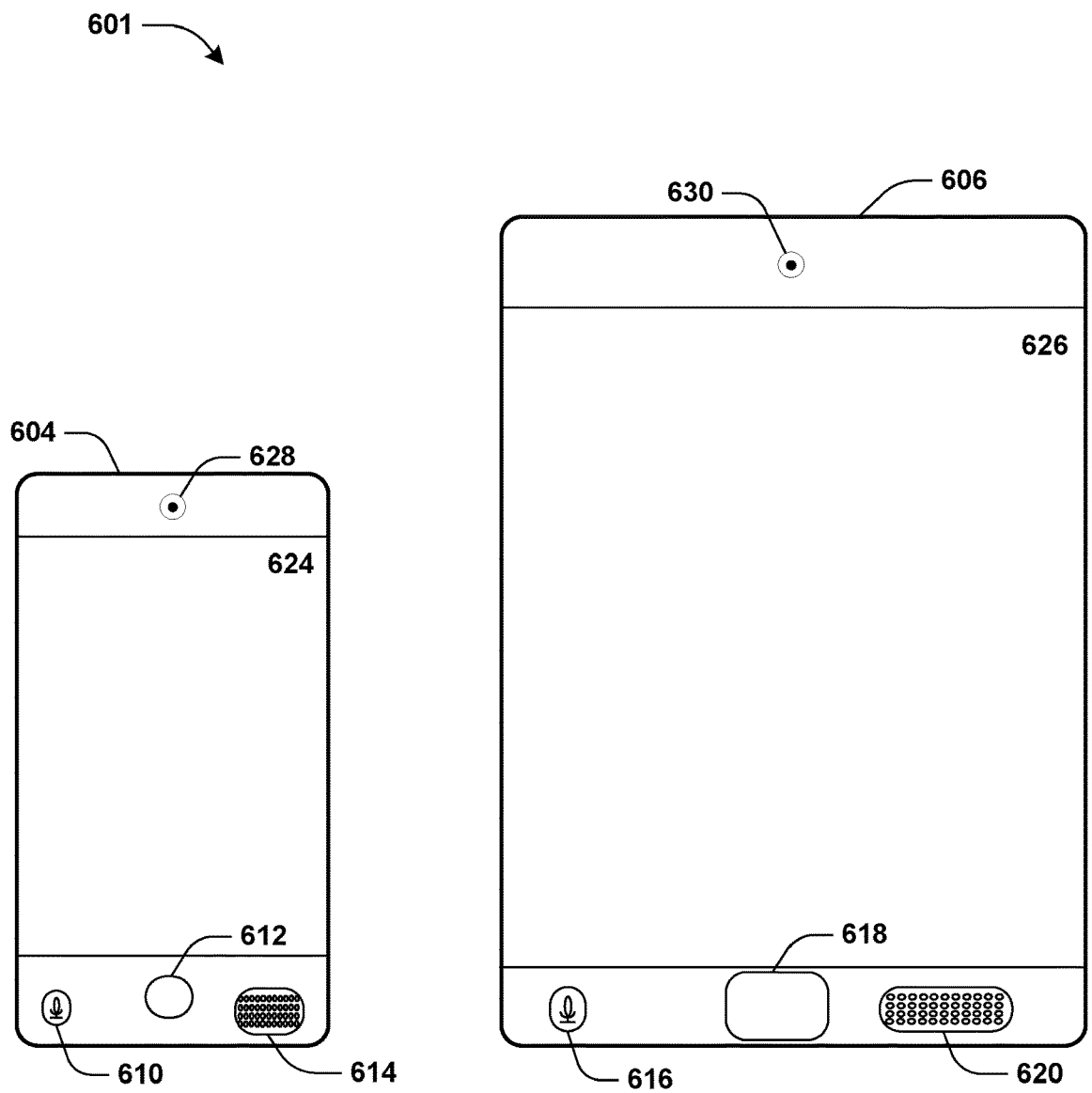
FIG. 6A is a component block diagram illustrating an example system for detecting a trigger phrase, detecting a command and transmitting an electronic message to a device, where a first trigger phrase in a first audio segment and a first command in a second audio segment are detected.
Figure 6A:
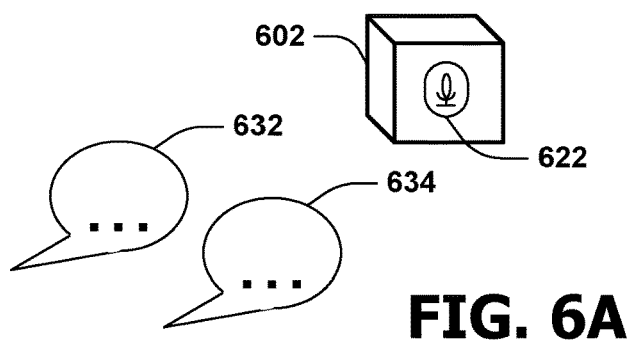
Figure 6B:
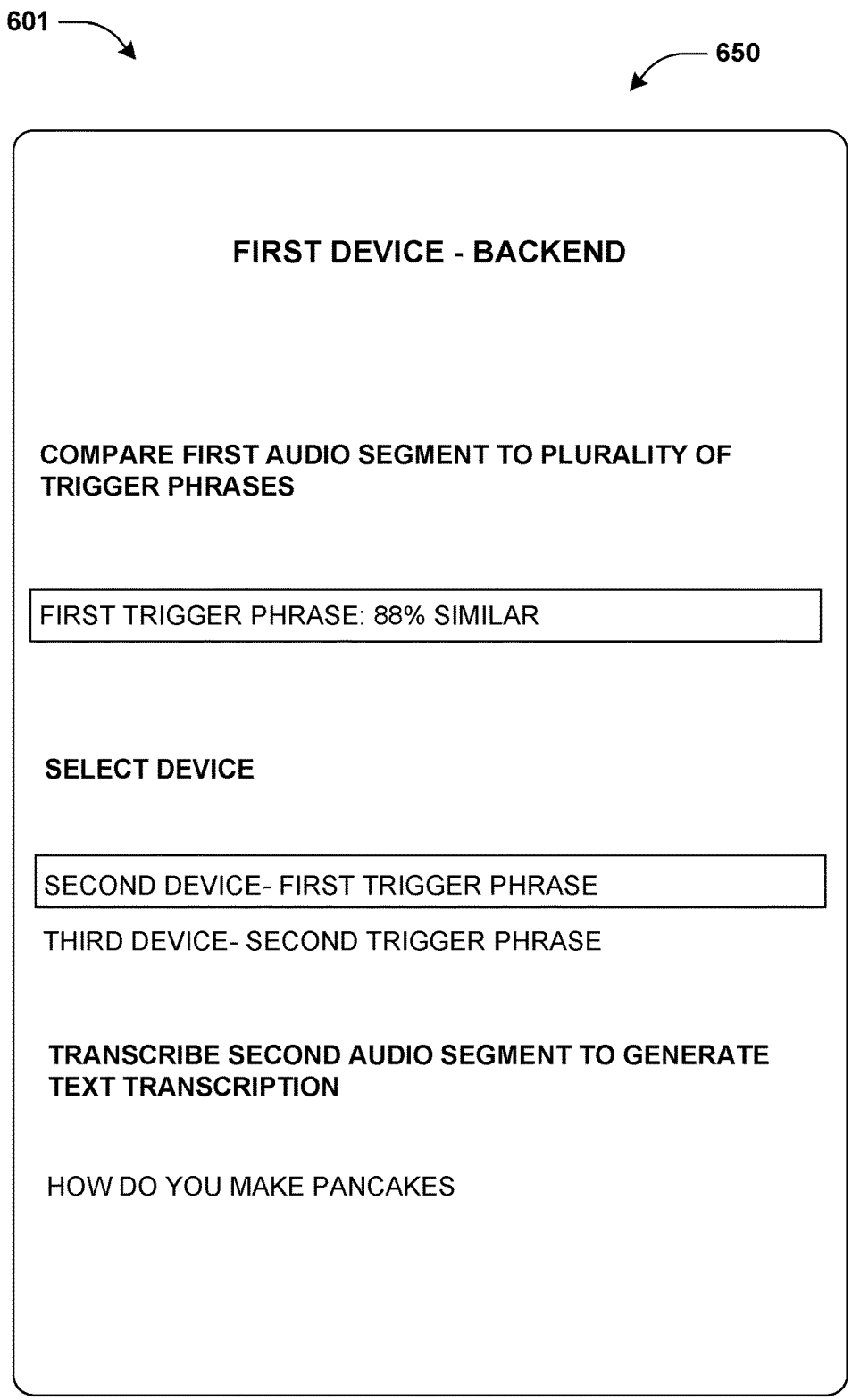
FIG. 6B is a component block diagram illustrating an example system for detecting a trigger phrase, detecting a command and transmitting an electronic message to a device, where a first audio segment is compared to a second trigger phrase and/or a second audio segment is transcribed to generate a text transcription.
Figure 6C:
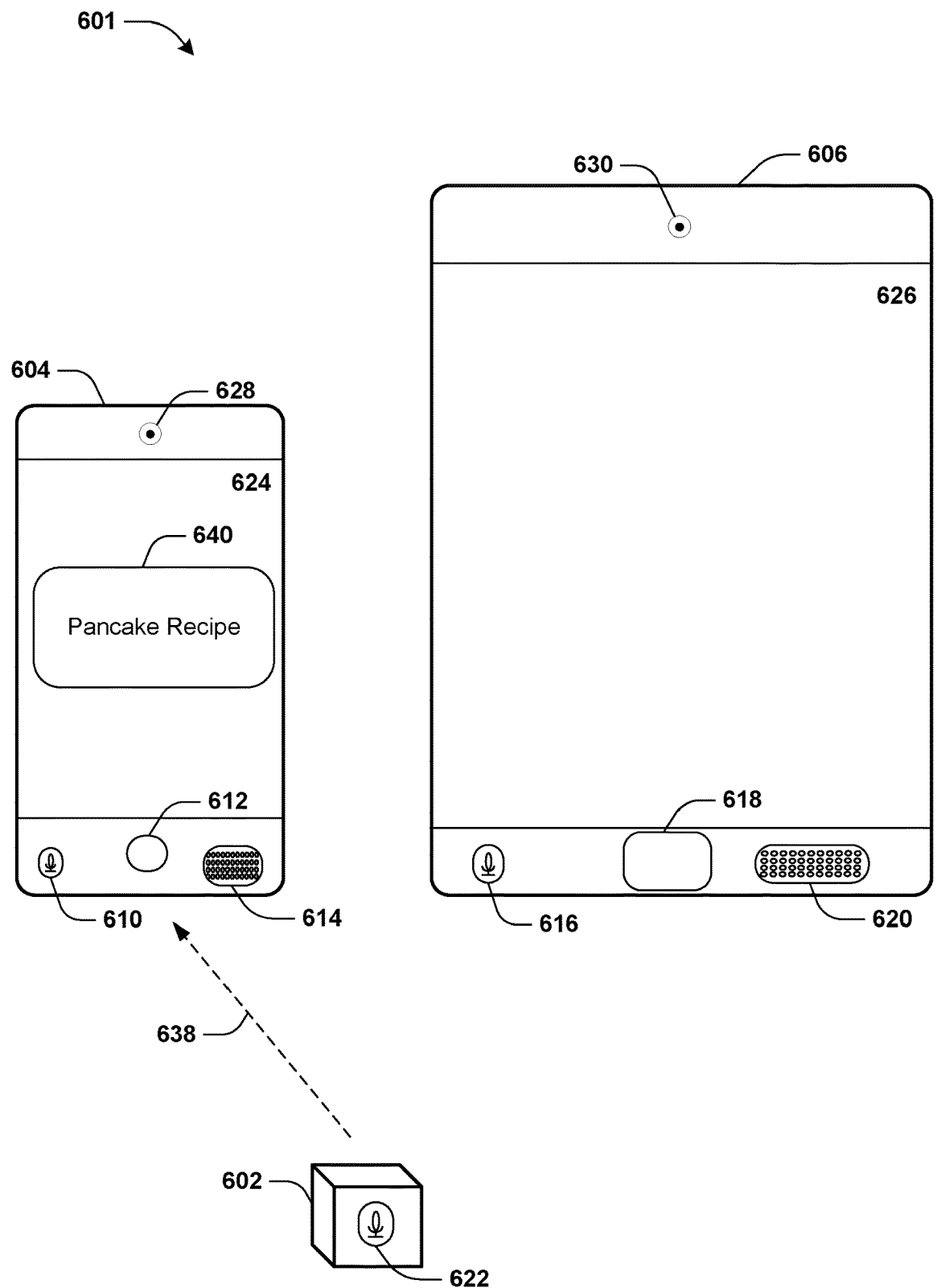
FIG. 6C is a component block diagram illustrating an example system for detecting a trigger phrase, detecting a command and transmitting an electronic message to a device, where a first electronic message is transmitted to a second device.

FIGS. 6A-6C illustrate examples of a system 601 for detecting a trigger phrase, detecting a command and transmitting an electronic message (e.g., associated with the command) to a device. A user, such as user Janet, may access and/or interact with a plurality of virtual assistants using a plurality of devices (e.g., smartphones, tablets, computers, smart speakers, voice command devices, etc.). Each device of the plurality of devices may have a virtual assistant of the plurality of virtual assistants (e.g., installed) and/or may be connected to a first device 602. The first device 602 may monitor audio received via a first microphone 622 of the first device 602. The plurality of devices may comprise a second device 604 (e.g., a smartphone) associated with a first virtual assistant (e.g., of the plurality of virtual assistants), a third device 606 (e.g., a tablet) associated with a second virtual assistant (e.g., of the plurality of virtual assistants) and/or one or more (e.g., other) devices associated with one or more (e.g., other) virtual assistants.

The second device 604 may comprise a camera 628, a screen 624, a microphone 610, a button 612 and/or a speaker 614. Alternatively and/or additionally, the third device 606 may comprise a camera 630, a screen 626, a microphone 616, a button 618 and/or a speaker 620. In some examples, the second device 604 and/or the first virtual assistant may be associated with a first trigger phrase of a plurality of trigger phrases corresponding to the plurality of virtual assistants. Alternatively and/or additionally, the third device 606 and/or the second virtual assistant may be associated with a second trigger phrase of the plurality of trigger phrases. The first trigger phrase may comprise "Hello Alpha" and the second trigger phrase may comprise "Hey Beta".

FIG. 6A illustrates the first device 602 detecting the first trigger phrase in a first audio segment 632 identified during the monitoring and a first command in a second audio segment 634 identified during the monitoring. For example, the first audio segment 632 may comprise the using saying "Hello Alpha". In some examples, at least a portion of the first audio segment 632 may be compared with (e.g., each trigger phrase of) a plurality of trigger phrases associated with the plurality of virtual assistants. The second audio segment 634 may comprise the user saying "How do you make pancakes?".

FIG. 6B illustrates a backend system 650 (e.g., on the first device 602, on a server connected to the first device 602 via a network, etc.) that may compare the first audio segment 632 to the second trigger phrase and/or transcribe the second audio segment 634 to generate a text transcription. For example, the first audio segment 632 may be compared to the first trigger phrase to determine that the first audio segment 632 comprises speech 88% similar to the first trigger phrase. Accordingly, the first trigger phrase may be identified responsive to determining that a similarity of at least a portion of the first audio segment 632 and the first trigger phrase is above a trigger phrase threshold (e.g., 85%). In some examples, responsive to identifying the first trigger phrase, the first device 602 may stop comparing the first audio segment 632 with trigger phrases of the plurality of trigger phrases. The second device 604 may be selected (e.g., from amongst the plurality of devices) based upon the first trigger phrase.

In some examples, the second audio segment 634 may (e.g., then) be transcribed to generate a text transcription (e.g., of the second audio segment 634). For example, the text transcription may comprise "HOW DO YOU MAKE PANCAKES". Alternatively and/or additionally, an audio file may be generated based upon the second audio segment 634.

FIG. 6C illustrates the first device 602 transmitting a first electronic message 638 to the second device 604. In some examples, the first device 602 may generate the first electronic message 638 comprising instructions to perform an action associated with the first command. For example, the first electronic message 638 may comprise the text transcription and/or the audio file. The first electronic message 638 may comprise a first push notification. In some examples, responsive to receiving the first electronic message 638, the second device 604 may perform the action. For example, the second device 604 may activate the screen 624, display a first graphical object 640 associated with the action using the screen 624, and/or output a first audio message associated with the action using the speaker 614. For example, the first graphical object 640 may comprise "Pancake Recipe" (e.g., and/or the first audio message may comprise cooking instructions for preparing pancakes).

It may be appreciated that the disclosed subject matter may assist a user in interacting with a plurality of virtual assistants by monitoring audio received using a microphone of a first device to detect trigger phrases and/or commands and/or by transmitting electronic messages based upon the trigger phrases and/or the commands to one or more devices of a plurality of devices (e.g., smartphones, tablets, computers, smart speakers, voice command devices, etc.) associated with the plurality of virtual assistants.

Implementation of at least some of the disclosed subject matter may lead to benefits including, but not limited to, a reduction in power consumption and/or an increase in battery life of the plurality of devices (e.g., as a result of the first device comprising a dedicated power source and/or being connected to a power supply, as a result of the microphone of the first device being activated to monitor audio received using the microphone, as a result of detecting trigger phrases and/or commands during the monitoring, as a result of transmitting electronic messages to the plurality of devices corresponding to the trigger phrases and/or the commands, as a result of a plurality of microphones of the plurality of devices being deactivated, as a result of the plurality of devices not monitoring audio received by the plurality of microphones, etc.).

Alternatively and/or additionally, implementation of at least some of the disclosed subject matter may lead to benefits including greater security and/or privacy for the user (e.g., as a result of the first device not being connected to the internet, as a result of the first device only connecting to the internet for voice recognition information responsive to detecting trigger phrases and/or commands, as a result of microphones of devices of the plurality of devices that are connected to the internet being deactivated, as a result of the devices that are connected to the internet not monitoring audio received by the microphones, etc.).

Alternatively and/or additionally, implementation of at least some of the disclosed subject matter may lead to benefits including a reduction in bandwidth (e.g., as a result of identifying the trigger phrases and/or transcribing the commands by accessing a voice recognition database stored in a memory device of the first device rather than in one or more servers, etc.). Alternatively and/or additionally, implementation of at least some of the disclosed subject matter may lead to benefits including an increase in speed and usability of the plurality of devices (e.g., as a result of fewer operations performed by the plurality of devices without monitoring audio received by the plurality of microphones, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 7:
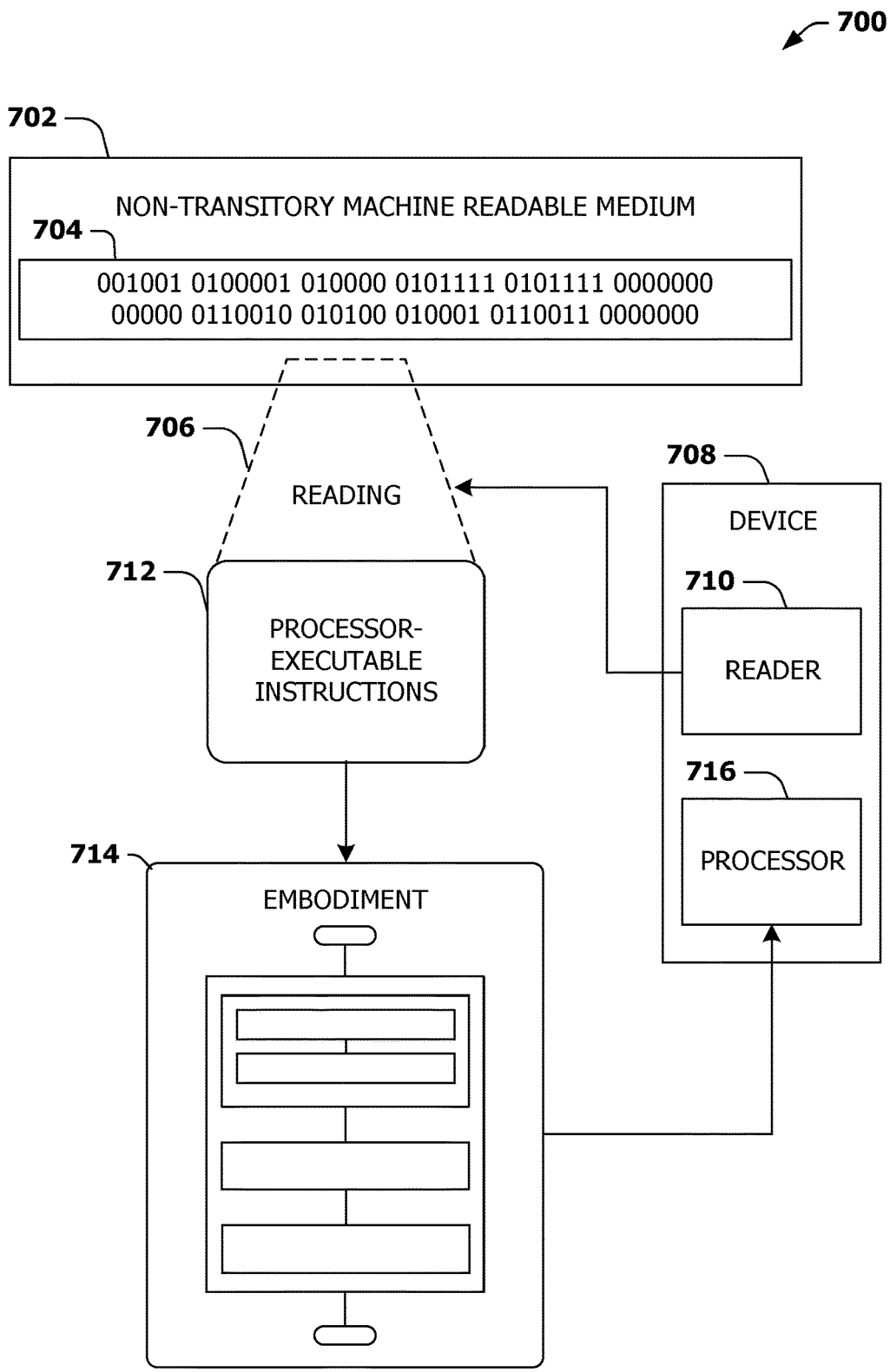
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4A and/or the example method 450 of FIG. 4B, for example. In some embodiments, the processor-executable instructions 712 are configured to cause implementation of a system, such as at least some of the example system 501 of FIGS. 5A-5C and/or the example system 601 of FIGS. 6A-6C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   monitoring audio received via a microphone of a first device, wherein a plurality of devices, comprising a second device and a third device, are concurrently in an area in which audio from an entity is receivable;
   responsive to detecting a first trigger phrase in a first audio segment identified during the monitoring:
     selecting the second device but not the third device, from amongst the plurality of devices, based upon the first trigger phrase;
     generating a first electronic message; and
     transmitting the first electronic message to the second device selected based upon the first trigger phrase but not the third device of the plurality of devices despite both the second device and the third device being in the area in which audio from the entity is receivable; and
   responsive to detecting a second trigger phrase in a second audio segment identified during the monitoring:
     selecting the third device but not the second device, from amongst the plurality of devices, based upon the second trigger phrase;
     generating a second electronic message; and
     transmitting the second electronic message to the third device selected based upon the second trigger phrase but not the second device of the plurality of devices despite both the second device and the third device being in the area in which audio from the entity is receivable.

2. The method of claim 1, comprising:
   identifying the first trigger phrase based upon a comparison of at least a portion of the first audio segment with a plurality of trigger phrases associated with the plurality of devices connected to the first device, each trigger phrase of the plurality of trigger phrases associated with a device of the plurality of devices.

3. The method of claim 2, comprising:
   identifying the second trigger phrase based upon a comparison of at least a portion of the second audio segment with the plurality of trigger phrases.

4. The method of claim 1, comprising:
   identifying the first trigger phrase based upon a comparison of at least a portion of the first audio segment with a plurality of trigger phrases associated with a plurality of virtual assistants, each trigger phrase of the plurality of trigger phrases associated with a virtual assistant of the plurality of virtual assistants; and
   identifying the second trigger phrase based upon a comparison of at least a portion of the second audio segment with the plurality of trigger phrases.

5. The method of claim 1,
   the entity comprising the first device.

6. The method of claim 1,
   the entity comprising a user of the first device.

7. The method of claim 1,
   the first device, the second device and the third device connected to a local area network, wherein the first electronic message is transmitted to the second device via the local area network and the second electronic message is transmitted to the third device via the local area network.

8. The method of claim 1, comprising:
   transmitting the first electronic message to the second device using a first wireless connection; and
   transmitting the second electronic message to the third device using a second wireless connection.

9. A computing device comprising:

a processor; and memory comprising processor-executable instructions that when executed by the processor cause performance of operations, the operations comprising:

monitoring audio received via a microphone of a first device, wherein a plurality of devices, comprising a second device and a third device, are concurrently in an area in which audio from an entity is receivable; and responsive to detecting a trigger phrase in a first audio segment identified during the monitoring and a command in a second audio segment identified during the monitoring:

selecting the second device but not the third device, from amongst the plurality of devices, based upon the trigger phrase;

generating an electronic message associated with the command; and transmitting the electronic message to the second device selected based upon the trigger phrase but not the third device of the plurality of devices despite both the second device and the third device being in the area in which audio from the entity is receivable.

10. The computing device of claim 9, the operations comprising:

identifying the trigger phrase based upon a comparison of at least a portion of the first audio segment with a plurality of trigger phrases associated with the plurality of devices connected to the first device, each trigger phrase of the plurality of trigger phrases associated with a device of the plurality of devices.

11. The computing device of claim 9, the plurality of devices connected to the first device.

12. The computing device of claim 9, the operations comprising:

transcribing the second audio segment to generate a text transcription; and determining the command based upon the text transcription.

13. The computing device of claim 9, the operations comprising:

transcribing the second audio segment to generate a text transcription, the electronic message comprising the text transcription.

14. The computing device of claim 9, the operations comprising:

responsive to detecting a second command in a third audio segment identified during the monitoring, associated with the command:

generating a second electronic message comprising instructions to perform a second action associated with the second command; and transmitting the second electronic message to the second device.

15. The computing device of claim 9, the first device and the second device connected to a local area network, wherein the electronic message is transmitted to the second device via the local area network.

16. The computing device of claim 9, the operations comprising:

transmitting the electronic message to the second device using a wireless connection.

17. The computing device of claim 9, the operations comprising:

responsive to detecting a second trigger phrase in a third audio segment identified during the monitoring and a second command in a fourth audio segment identified during the monitoring:

generating a second electronic message comprising instructions to perform a second action associated with the second command; and transmitting the second electronic message to the third device.

18. A non-transitory machine readable medium having stored thereon processor-executable instructions that when executed cause performance of operations, the operations comprising:

monitoring audio received via a microphone of a first device, wherein a plurality of devices, comprising a second device and a third device, are concurrently in an area in which audio from an entity is receivable; and responsive to detecting a trigger phrase in a first audio segment identified during the monitoring:

selecting the second device but not the third device, from amongst the plurality of devices, based upon the trigger phrase;

generating a first electronic message; and transmitting the first electronic message to the second device selected based upon the trigger phrase but not the third device of the plurality of devices despite both the second device and the third device being in the area in which audio from the entity is receivable.

19. The non-transitory machine readable medium of claim 18, the operations comprising:

identifying the trigger phrase based upon a comparison of at least a portion of the first audio segment with a plurality of trigger phrases associated with the plurality of devices connected to the first device.

20. The non-transitory machine readable medium of claim 19, each trigger phrase of the plurality of trigger phrases associated with a device of the plurality of devices.

* * * * *